Jan. 12, 1937.     S. J. ROVINSKY     2,067,346
REGULATING VALVE
Filed Sept. 7, 1935
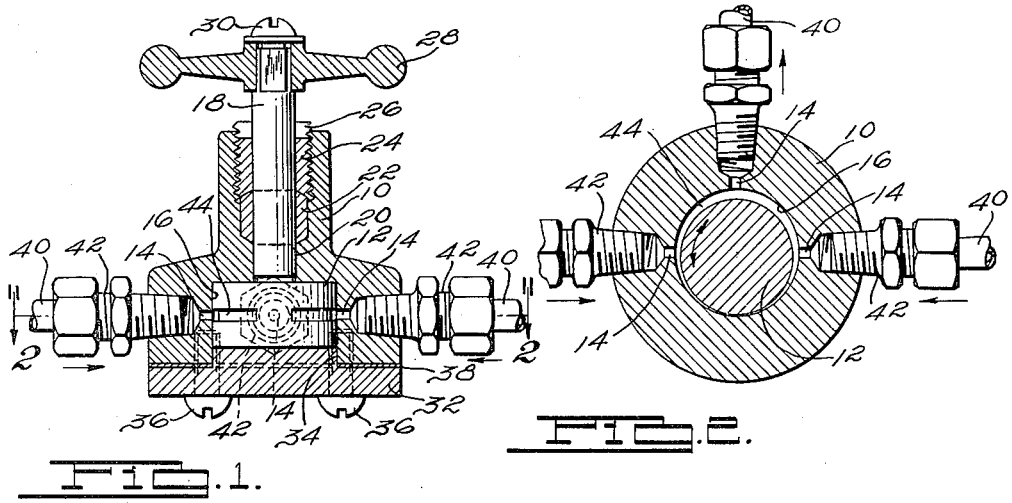
Fig. 1.   Fig. 2.
Fig. 3.
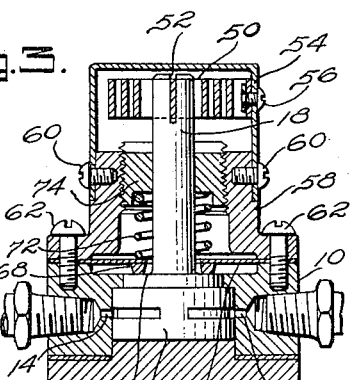
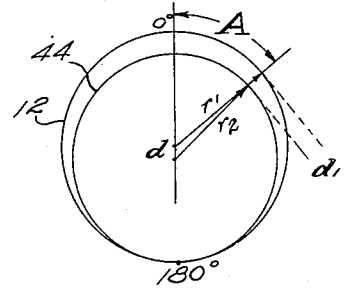
Fig. 5.
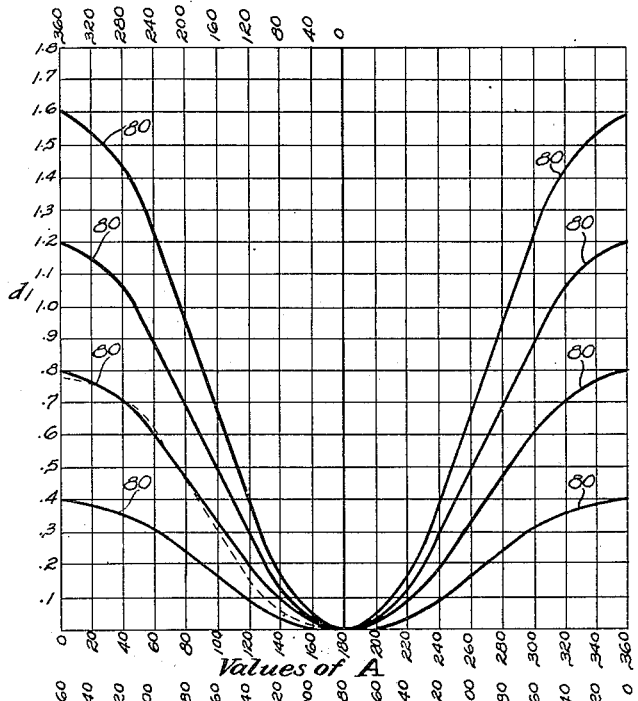
Fig. 4.
INVENTOR.
Stanley J. Rovinsky
BY
Harness, Dickey, Pierce & Hann.
ATTORNEYS.

Patented Jan. 12, 1937

2,067,346

UNITED STATES PATENT OFFICE 2,067,346

REGULATING VALVE

Stanley J. Rovinsky, Menominee, Mich., assignor to Ransom H. Beman

Application September 7, 1935, Serial No. 39,506

6 Claims. (Cl. 251—92)

The present invention relates to devices for regulating or adjusting the flow of fluids or the like, and more particularly to such devices as are constructed to provide a relatively high degree of regulating accuracy.

It is an object of the present invention to provide a device for regulating the flow of fluids or the like which provides a highly accurate regulating action throughout the entire regulating range.

It is also an object of the present invention to provide a device for regulating the flow of fluids or the like embodying relatively movable members, and in which the variation in flow is non-linear with respect to the movement of such members.

It is also an object of the present invention to provide a device for regulating the flow of fluids or the like, embodying relatively movable members, and in which the variation in flow may bear any desired non-linear relation to the movement of such members.

It is also an object of the present invention to provide a device for regulating the flow of fluids or the like, embodying a body member and a rotatable member supported in cooperative relation thereto, and having a groove formed therein to control the volume of flow through the device in response to rotation of said members.

It is also an object of the present invention to provide a device of the last mentioned character in which the groove is so formed as to effect a non-linear variation in said flow with respect to movement of the rotatable member.

It is also an object of the present invention to provide a device having characteristics of the type mentioned above and which may be conveniently adapted for either the direct control or the mixing or distribution of fluids or the like.

It is also an object of the present invention to provide a regulating device embodying characteristics such as mentioned above, and which may conveniently be adapted for either manual or automatic control.

It is also an object of the present invention to provide a device for regulating the flow of fluids or the like, which is simple in construction, economical of manufacture, and positive in operation.

Other objects and advantages of the present invention appear in the following description and in the appended claims.

In the drawing, throughout which corresponding reference characters are used to designate corresponding parts, Figure 1 is a view in vertical axial section of an illustrative embodiment of the present invention;

Fig. 2 is a view in horizontal section, taken on the line 2—2 of Fig. 1;

Fig. 3 is a view in vertical axial section of an embodiment of the present invention illustrating the use thereof in connection with automatic control mechanism;

Fig. 4 is a family of curves illustrating the operating characteristics of preferred embodiments of the present invention; and Fig. 5 is a diagram illustrating the derivation of the curves in Fig. 4.

Many devices have been proposed for the purpose of regulating the flow of fluids or the like in various systems. Fundamentally, the systems involve either regulation or variation of the fluid head or pressure, regulation of the resistance to flow, as by varying the orifice size, or a combination of both of these principles. In considering the improvement to which the present invention is particularly directed, fluid regulating devices may be classified as for the control of relatively low rates of flow at relatively high pressures, for the control of relatively low rates of flow at relatively low pressures, and for the control of relatively high rates of flow at high pressures.

Previously developed flow regulators are found to be relatively satisfactory for the control of relatively low rates of flow at relatively low pressures, and for the control of relatively high rates of flow at relatively high pressures. Practical limitations of manufacturing accuracy and design, however, have made it difficult heretofore to secure a satisfactory method for the regulation of low rates of flow at high pressures, and the present invention is directed to the provision of a flow regulator particularly adapted for this purpose. As will appear more fully hereinafter, however, a construction embodying the present invention is equally well adapted for the control of low rates of flow at low pressures and high rates of flow at high pressures.

In accordance with the present invention, the flow regulator is so constructed that the variation in flow is non-linear with respect to the movement of the regulating member of the device. In accordance with this principle, as the flow regulation approaches critical points, the degree of variation in flow per unit of movement of the regulating member is reduced. Relatively high accuracy of control at critical points over a regulating range is thus possible, since relatively large movements of a regulating member may be accompanied by relatively minute variations in flow. As will appear more fully hereinafter, this modulation of the regulating action may be introduced throughout any desired portion of the regulating range and any desired non-linear relationship may be provided in a relatively simple manner. As will also be apparent from further description, the present invention may conveniently be utilized in a wide variety of regulating applications, illustrative applications including the direct control of flow, or the mixing or distribution of a plurality of flows. The control also may be effected either manually or automatically, in accordance with illustrated embodiments of the present invention.

The preferred construction of the present invention comprises a valve embodying a body member having a central opening which communicates with the exterior of the body through one or more ports. A rotatable regulating member is received within the opening, and is provided with an exterior groove or opening selectively registrable along its length with the above mentioned port, in accordance with rotation of the rotatable member. The groove is of varying area, so that the flow is increased or decreased in response to rotation of the rotatable member in one direction or the other.

The non-linear variation in flow, with respect to rotation of the rotatable member, is introduced by forming the groove so that as the member is rotated, the volume of the groove between cooperating parts, varies sinusoidally and non-linearly. As illustrated, the groove is arcuate, and eccentrically positioned with respect to the rotatable member. With this arrangement, and depending upon the degree of eccentricity, a flow regulation characteristic is provided in which the flow is substantially linear throughout the intermediate portions of the range, but flattens off substantially as the limits of the range are approached.

Referring particularly to Figs. 1 and 2, and considering the above mentioned elements in more detail, the device comprises generally a body 10, a regulating member 12 and a plurality of inlet or outlet ports 14. The body 10 is generally circular in cross section, and is provided with an enlarged lower portion which is hollowed out to provide a circular opening 16, within which the regulating member 12 is rotatably received.

The shank 18, which, as illustrated, is formed integrally with the regulating member 12, extends through the relatively restricted opening 20 in member 10, and through a suitable packing gland 22, packing ring 24, and retaining ring 26, which is threaded into body member 10. Shank 18 may be arranged for rotation in any desired manual or automatic manner, a simple manually rotatable handle 28 being illustrated as secured at the upper end of shank 18 by a screw 30.

An end plate 32, having an inwardly extending cylindrical shoulder 34 of substantially the diameter of opening 16, is fitted over the lower end of body 10 and is secured thereto in any suitable manner as by studs 36. If desired, a suitable gasket such as 38 may be interposed between body 10 and end plate 32.

The ports 14, the number and spacing of which around the circumference of body 10 is determined in accordance with the application to which the regulator is to be put, communicate with suitable intake and output lines 40 through nipples 42 which are threaded into body 10.

As illustrated, the regulating groove 44 is cut directly into the surface of regulating member 12. As shown, the width of groove 44 is substantially equal to the diameter of ports 14. Although the variation in depth of groove 44 may be modulated in any desired way throughout its length in accordance with the desired variation in flow, I prefer to form groove 44 as the arc of a circle, eccentrically located with respect to the axis of regulating member 12. As illustrated, the maximum depth of groove 44 is equal to substantially twice the eccentricity and occurs at the midpoint of the groove. The depth progressively decreases as the ends of the groove are approached. The groove extends only partially around member 12, leaving a certain uncut area of the latter.

As will be obvious from Fig. 2, regulating member 12 may be rotated in either direction to a position in which groove 12 is entirely out of registration with any one of the ports 14, thus effectively closing off such selected port. Rotation of regulating member 12 in either direction from such closed position moves groove 44 into registration with such closed off port, permitting flow between inlet and outlet ports 14 through groove 44. Further rotation of member 12 gradually increases the flow. Accordingly, considering any two ports 14, the flow through the device may be regulated from zero flow to maximum flow by such rotation.

As also shown in Fig. 2, the device may be used to divide a predetermined flow between a plurality of ports in any predetermined ratio or to provide a mixing of a plurality of flows in any predetermined ratio. Considering all three of the ports shown in Fig. 2 and with the parts in the illustrated position, the two horizontal ports 14 are in registration with grooves 44 at points of equal depth. Accordingly, the flow through such horizontal ports is equal and combine to constitute the flow through the vertical port 14. Rotation of regulating member 12 in either direction increases the flow through one horizontal port 14 and decreases the flow through the other horizontal port 14, since the depth of groove 44 at the point in registration with such ports is thereby varied. As illustrated, such rotation also restricts the total flow through the vertical port 14. As will be obvious, the variation in ratio thus provided between the flow through the horizontal ports, as well as the variation in flow through the vertical port, depends upon the configuration of groove 44, and the degree of rotation of member 12.

As illustrative of the use of the regulating device of the present invention in connection with automatically controlled regulation, Fig. 3 embodies a conventional thermally responsive element 50 a portion of which is slidably received in a slot 52 formed at the upper end of shank 18. The other end of element 50 is secured to an enclosure 54 by a suitable stud 56. Housing 54 is secured to a body portion 58 by one or more studs such as 58.

The interior of body 10 is sealed from the interior of body portion 60 by a sealing ring 66, the edges of which are apertured to permit passage therethrough of securing studs 62, and the central portion of which is provided with a depending sealing gland 68, the lower edges of which bear against a shoulder 70 formed at the base of shank 18. A spring 72, seated between sealing ring 66 and a retaining ring 74 which is threaded into the upper portion of member 60, continuously urges ring 66 into sealing relationship with shoulder 70. As will be understood, element 50 may be caused to respond to either the temperature of the fluid or to external temperatures. The variations in temperature of element 50 cause a flexing or bending thereof, which subjects shank 18 to a turning force. The resulting rotation of shank 18 modifies the flow through the ports 14 in the manner described in connection with Fig. 2.

As will be obvious from the foregoing, the maximum flow is determined in accordance with the volume of the groove between an inlet and an outlet port, and the variation in flow is determined by the configuration of the groove throughout its length. A wide range of variation in flow is accordingly possible in the practice of the present invention by suitably varying the maximum depth of the groove, and any desired modulation in flow throughout the operating range is available by suitably forming the groove contour. I prefer to form the groove arcuately and to eccentrically position it with respect to the regulating member because of the desirable regulating characteristics it has thus been found to provide, and because of the relative ease of manufacture of a unit embodying a groove of this form. Figs. 4 and 5 are illustrative of the operating characteristics of the illustrated arcuate and eccentrically formed groove. As shown in Fig. 5, the centers of regulating member 12 and of groove 44 are spaced apart a distance $d$, thus providing a groove of depth $d_1$. The depth of groove $d_1$ varies progressively from a maximum to zero. Zero flow corresponds to a value of the displacement angle A within a limited range above or below 180°, and maximum flow corresponds to a displacement angle A of 0° or of 360°. In Fig. 5 each curve 80 represents the variations in groove depth as the displacement angle A is varied progressively through a 360° cycle. The ordinate value of each curve 80 at the zero and 360° points, corresponds, as will be understood, to the maximum groove depth $d_1$, and as will be obvious, any desired regulating range is thus available by suitably evaluating the groove depth. It will be noted that in each of the characteristic curves, the curve slope flattens off as each limiting position is approached. This characteristic provides relatively minute variations in flow corresponding to relatively large angular rotations of the regulating member 12 as such limiting positions are approached, and provides a highly accurate regulating action without requiring extreme accuracy in the angular rotation of the regulating member. This flattening out of the flow characteristic is particularly desirable as mentioned previously, in connection with the control of low rates of flow at high pressure, but has been found to be useful also in the control of other flow characteristics. As also illustrated by the curve of Fig. 5, while the groove may be formed to provide a gradual variation in flow from a maximum to a zero flow, it will also be obvious that the groove may be limited to control only an intermediate variation in flow.

Although specific embodiments of the present invention have been described, it will be evident that various modifications may be made in the form, number and arrangement of parts without departing from the spirit and scope of the present invention. The described embodiments, accordingly, are to be considered in an illustrative, and not in a limiting, sense.

What I claim is:

1. A device for regulating the flow of fluids or the like comprising a casing having ports, a rotary member within and snugly fitting the wall of the casing and having a circumferential groove in its peripheral surface and located in the plane of the ports, said groove having a constant width throughout its length at the surface of the rotary member and having a circular base which is eccentric to said surface, and means for turning the rotary member.

2. A device for regulating the flow of fluids or the like comprising a casing having ports, a rotary member within and snugly fitting the wall of the casing and having a circumferential groove in its peripheral surface and located in the plane of the ports, said groove having a constant width throughout its length at the surface of the rotary member and having a cylindrical base which is eccentric to said surface, and substantially equal in width to the width of the groove at the surface of the rotary member, and means for turning the rotary member.

3. A device for regulating the flow of fluids or the like comprising a casing having ports, a rotary member within and snugly fitting the wall of the casing and having a circumferential groove in its peripheral surface and located in the plane of the ports, said groove having radial side walls and a cylindrical base arranged eccentrically to the surface of the rotary member with the width of the groove substantially constant throughout its length and substantially equal to the width of the ports.

4. A device for regulating the flow of fluids or the like comprising an inner rotary member having a circumferential groove in its peripheral surface wherein the groove is substantially channel shaped in transverse section and is substantially of constant width throughout its length at the peripheral surface of the member, the base of the groove being cylindrical and eccentric to the periphery of the rotary member and having its ends merging with the peripheral surface of the rotary member at the junction of the arc of curvature of the base with the arc of curvature of the peripheral surface of the rotary member, and an outer member snugly receiving the rotary member and having a plurality of ports substantially equal in width to that of the groove and located in the plane of the latter.

5. A device for regulating the flow of fluids or the like comprising an outer casing member and an inner member rotatable relatively and having their adjacent peripheral surfaces closely fitting, one of the members having circumferentially spaced ports in its peripheral surface and the other having a circumferential groove in its peripheral surface and in the plane of the ports, said groove having a circular base eccentric to the surfaces, and the cross-sectional area of the groove varying sinusoidally along its length from one end thereof to the other and the variation of said area between the deepest part of the groove and the parts of least depth including a major substantially linear variation.

6. A device for regulating the flow of fluids or the like comprising inner and outer relatively rotary members, circumferentially spaced ports in the outer member, the inner member having a circumferential groove in its surface and located in the plane of the ports with the width of the groove at such surface substantially constant throughout its length and substantially equal to the width of the ports, the area of transverse sections of the groove varying progressively along the groove depending upon the variations in depth only along the groove, and means for turning one of the members.

STANLEY J. ROVINSKY.